(12) United States Patent
Kim et al.

(10) Patent No.: US 11,914,584 B2
(45) Date of Patent: Feb. 27, 2024

(54) METHOD AND APPARATUS FOR RESET COMMAND CONFIGURATION, DEVICE AND STORAGE MEDIUM

(71) Applicant: Lemon Inc., Grand Cayman (KY)

(72) Inventors: Hai Quang Kim, Los Angeles, CA (US); Cheng Fang, Beijing (CN); Lu Tao, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/055,129

(22) Filed: Nov. 14, 2022

(65) Prior Publication Data

US 2023/0297568 A1  Sep. 21, 2023

(30) Foreign Application Priority Data

Jan. 29, 2022 (CN) .......................... 202210112142.1

(51) Int. Cl.
*G06F 16/242* (2019.01)
*G06F 16/23* (2019.01)
*G06F 16/28* (2019.01)

(52) U.S. Cl.
CPC ........ *G06F 16/244* (2019.01); *G06F 16/2358* (2019.01); *G06F 16/289* (2019.01)

(58) Field of Classification Search
CPC ... G06F 16/244; G06F 16/2358; G06F 16/289
See application file for complete search history.

(56) References Cited

U.S. PATENT DOCUMENTS

| | | |
|---|---|---|
| 2011/0113326 A1 | 5/2011 | Baer |
| 2019/0042374 A1 | 2/2019 | Kumar |
| 2021/0223967 A1* | 7/2021 | Duval .................. H04L 9/3242 |

FOREIGN PATENT DOCUMENTS

| | | |
|---|---|---|
| CN | 107229540 A | 10/2017 |
| CN | 112001984 A | 11/2020 |
| CN | 106575231 B | 3/2021 |

OTHER PUBLICATIONS

ISA China National Intellectual Property Administration, International Search Report Issued in Application No. PCT/SG2023/050035, dated Aug. 25, 2023, WIPO, 10 pages.

* cited by examiner

*Primary Examiner* — Etienne P Leroux
(74) *Attorney, Agent, or Firm* — Alleman Hall & Tuttle LLP (57) ABSTRACT

Embodiments of the present disclosure provide a method and apparatus for reset command configuration, a device, and a storage medium, the method, applied to an editor of target software, includes: starting a command group storage unit and starting a snapshot session through the inputted startGroup command; directly performing the reset command configuration on the target software in an command-type manner through the inputted operation execution command; converting change information of an object in the snapshot-type session into a command pair through the snapshot capture command, pressing the command pair into the command group storage unit, and using all command groups of the command pair as a reset command to realize performing the reset command configuration on the target software in the snapshot-type manner, thereby achieving that the target software supports both the command-type reset command configuration and the snapshot-type reset command configuration.

18 Claims, 5 Drawing Sheets

METHOD AND APPARATUS FOR RESET COMMAND CONFIGURATION, DEVICE AND STORAGE MEDIUM

CROSS-REFERENCE TO RELATED APPLICATIONS

This application claims priority to Chinese Patent Application No. 202210112142.1, filed on Jan. 29, 2022, which is hereby incorporated herein by reference in its entirety.

TECHNICAL FIELD

Embodiments of the present disclosure relate to a field of a computer technology, and in particular, to a method and apparatus for reset command configuration, a device, and a storage medium.

BACKGROUND

With the continuous advancement of computer technology, there are more and more software running on terminal devices. In software configured with a reset function, a user may execute a reset command by combination keys or directly clicking a button in a menu bar, including an undo command and a redo command, to undo an operation of a previous step or re-execute an operation just canceled, which improves the efficiency of creation. The reset command in such software is configured by the developer in advance.

At present, the common reset command configuration mainly includes two types: a command-type and a snapshot-type. However, at the initial stage when the software goes online with the reset function, most software objects (instances of data classes in the software) do not have a relatively complete data model, and may only use the command-type configuration. However, as the snapshot-type configuration is convenient to operate, and with the development of the software, the data model will become more and more complete, so the snapshot-type reset command configuration is a function that developers ultimately desire to achieve. Therefore, how to support both the command-type reset command configuration and the snapshot-type reset command configuration when the software goes online with the reset function has become an urgent problem to be solved.

SUMMARY

Embodiments of the present disclosure provide a method and apparatus for reset command configuration, a device, and a storage medium, so as to achieve the technical effect of supporting both the command-type reset command configuration and the snapshot-type reset command configuration, which is convenient for the developers to perform the reset command configuration on the target software in different configuration manners.

In a first aspect, an embodiment of the present disclosure provides a method for reset command configuration, which is applied to an editor of target software, the editor is configured with a command inputting module, and the command inputting module is used to input a startGroup command, an endGroup command, a snapshot capture command and an operation execution command for executing command-type configuration; the method includes:

starting a command group storage unit and starting a snapshot session in response to the inputted startGroup command;

putting at least one target object into the snapshot session in response to the inputted snapshot capture command, where each target object corresponds to an instance of a data class in the target software;

updating a status of each target object in the snapshot session based on a simulation operation;

in response to the inputted endGroup command, closing the snapshot session, extracting each target object from the snapshot session to obtain change information of each target object before and after updating, generating a command pair for each target object according to the change information, pressing the command pair into the command group storage unit, and closing the command group storage unit; and pressing a reset command into a reset command stack of the target software by using all command groups of the command pair in the command group storage unit as the reset command, for a user to perform an undo operation or a redo operation when using the target software.

In a second aspect, an embodiment of the present disclosure provides an apparatus for reset command configuration, including:

a starting module, configured to start a command group storage unit and start a snapshot session in response to the inputted startGroup command;

an object processing module, configured to put at least one target object into the snapshot session in response to the inputted snapshot capture command, where each target object corresponds to an instance of a data class in the target software;

an object updating module, configured to update a status of each target object in the snapshot session based on a simulation operation;

a command generating module, configured to, in response to the inputted endGroup command, close the snapshot session, extract each target object from the snapshot session to obtain change information of each target object before and after updating, generate a command pair for each target object according to the change information, press the command pair into the command group storage unit, and close the command group storage unit; and a command pressing module, configured to press a reset command into a reset command stack of the target software by using a command group of all command pairs in the command group storage unit as the reset command, for a user to perform an undo operation or a redo operation when using the target software.

In a third aspect, an embodiment of the present disclosure provides an electronic device, including: a processor and a memory;

the memory has a computer-executable instruction stored therein;

the processor executes the computer-executable instruction stored in the memory to enable the processor to perform the method for reset command configuration described in the first aspect above and various possible designs of the first aspect.

In a fourth aspect, an embodiment of the present disclosure provides a computer readable storage medium storing a computer-executable instruction, when the computer-executable instruction is executed by a processor, the method for reset command configuration described in the first aspect above and various possible designs of the first aspect is implemented.

In the method and apparatus for reset command configuration, the device, and the storage medium provided in the embodiments, the method starts a command group storage unit and starts a snapshot-type session through the inputted startGroup command; the developer may either directly perform the reset command configuration on the target software in an command-type manner through the inputted operation execution command, or realize performing the reset command configuration on the target software in the snapshot-type manner by converting change information of an object in the snapshot session into a command pair through the snapshot capture command, pressing the command pair into the command group storage unit, and using all command groups of the command pair as a reset command; thereby achieving that the target software supports both the command-type reset command configuration and the snapshot-type reset command configuration, which is convenient for the developer to perform the reset command configuration on the target software in different configuration manners.

BRIEF DESCRIPTION OF DRAWINGS

In order to illustrate the embodiments of the present disclosure or the technical solutions in the prior art more clearly, the following briefly introduces the accompanying drawings that need to be used in the description of the embodiments or the prior art. Obviously, the accompanying drawings in the following description are some embodiments of the present disclosure, and for those of ordinary skill in the art, other accompanying drawings may also be obtained from these accompanying drawings without any creative work.

DESCRIPTION OF EMBODIMENTS

In order to make the purposes, technical solutions and advantages of the embodiments of the present disclosure more clear, the technical solutions in the embodiments of the present disclosure will be described clearly and completely below in combination with the accompanying drawings in the embodiments of the present disclosure. Obviously, the described embodiments are part of the embodiments of the present disclosure, not all of them. Based on the embodiments in the present disclosure, all other embodiments obtained by an ordinary person skilled in the art without paying creative work all belong to the protection scope of the present disclosure.

At present, there are more and more software running on terminal devices, and the comprehensive content creating software is also emerging in endlessly. Content creation and release in such content creating software is an extremely important link in its ecology, and users can perform content creation and release operations in the content creating software. In a content creating software configured with a reset function, a user may execute a reset command through combination keys or by directly clicking a button in a menu bar, including an undo command and a redo command, to undo an operation of a previous step or re-execute an operation just canceled, which improves the efficiency of the creation. The reset command in such software is configured by the developer in advance.

At present, the common reset command configuration mainly includes two types: a command-type and a snapshot-type. The command-type needs to create a corresponding reset command for each operation of the user, but since a reset command needs to be created for each operation, which is difficult to develop, and the user is prone to errors when using it. The snapshot-type only needs to store snapshot data before or after the user operation. When the user operates the reset command, the content of the stored snapshot data before or after the operation may be updated directly. The operation is very convenient, but the snapshot-type requires each object (an instance of a data class) in the content creating software has a relatively complete data model.

However, at the initial stage when the content creating software goes online with the reset function, most objects do not have a relatively complete data model, and may only use the command-type configuration. However, as the snapshot-type configuration is convenient to operate, and with the development of the content creating software, the data model will become more and more complete, so the snapshot-type reset command configuration is a function that the developers ultimately desire to achieve. Therefore, how to support both the command-type reset command configuration and the snapshot-type reset command configuration when the content creating software goes online with the reset function has become an urgent problem to be solved.

In order to solve the above problem, embodiments of the present disclosure provide a method for reset command configuration to support both the command-type reset command configuration and the snapshot-type reset command configuration and facilitate the developer to perform the reset command configuration on the target software in different configuration manners.

Figure 1:
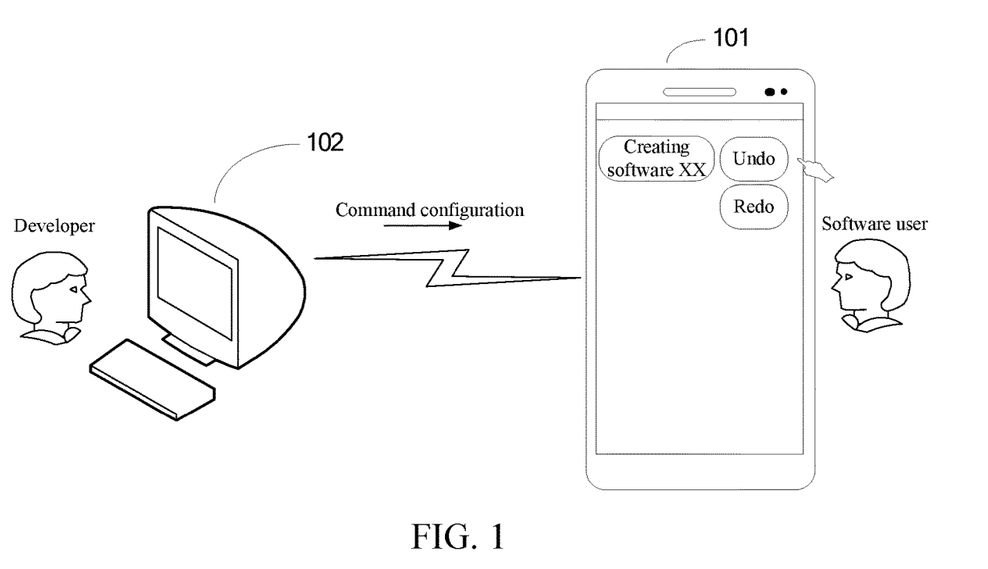
FIG. 1 is a schematic diagram of a scenario of a method for reset command configuration provided by an embodiment of the present disclosure.

Referring to FIG. 1, FIG. 1 is a schematic diagram of a scenario of a method for reset command configuration provided by an embodiment of the present disclosure. As illustrated in FIG. 1, the system provided in the embodiment includes a terminal device 101 and an electronic device 102.

The terminal device 101 may be a mobile phone, a tablet computer, a personal computer or other devices, and the terminal device 101 is installed with target software with reset functions of an undo button (undo) and a redo button (redo). The target software may be a content creating software. The implementation manner of the terminal device 101 is not particularly limited in the embodiment, as long as the terminal device 101 can perform input and output interaction with the software user.

The electronic device 102 may be a server or a cluster composed of several servers, and may be a computing device such as a personal computer. It should be noted that an editor for the target software is installed on the electronic device 102, and the developer may realize the command configuration of the target software by operating the editor, specifically, the reset commands, such as undo and redo, may be operated on the target software.

Figure 2:
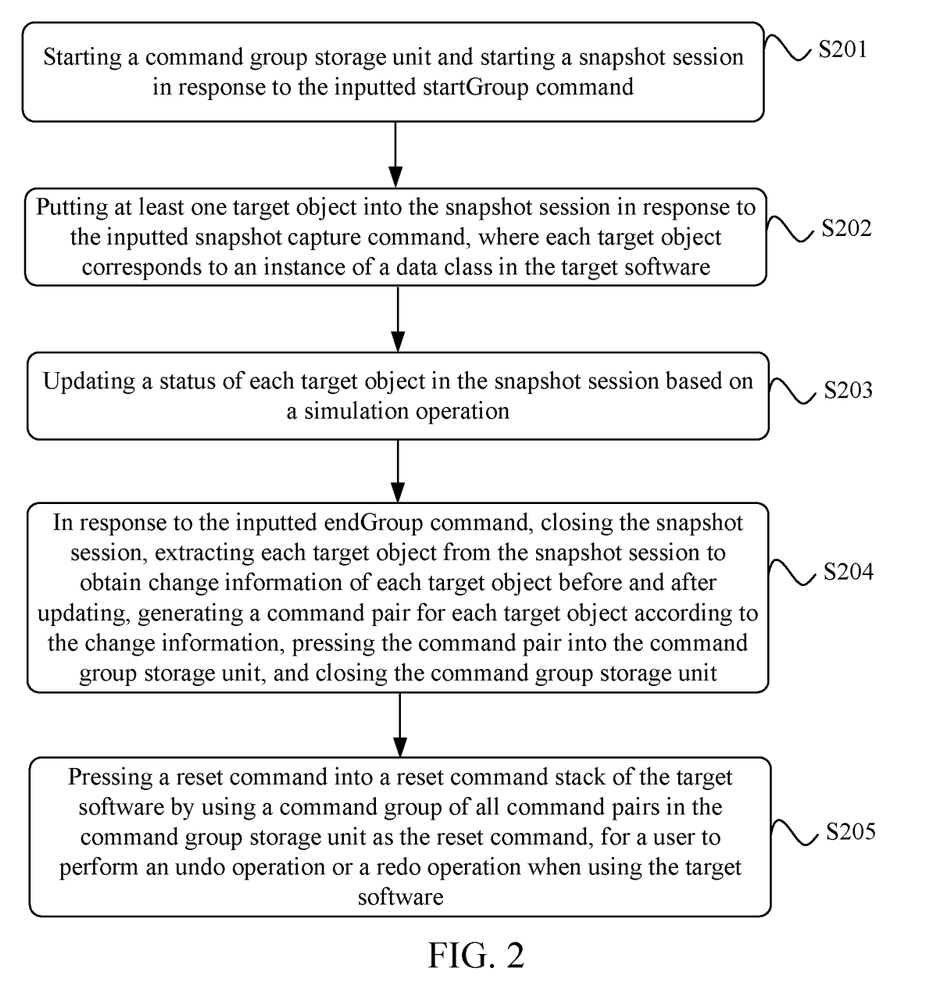
FIG. 2 is a first schematic flowchart of a method for reset command configuration provided by an embodiment of the present disclosure.

Referring to FIG. 2, FIG. 2 is a first schematic flowchart of a method for reset command configuration provided by an embodiment of the present disclosure. The method of the embodiment may be applied to the electronic device shown in FIG. 1, specifically, to an editor for any target software installed on the electronic device, the editor is configured with a command inputting module, and the command inputting module is used to input a startGroup command, an endGroup command, a snapshot capture command and an operation execution command for executing command-type configuration. In the embodiment of the present disclosure, the developer may directly perform the reset command configuration on the target software in a command-type manner by inputting an operation execution command into the command inputting module of the editor. The method for reset command configuration includes the following steps.

S201: starting a command group storage unit and starting a snapshot session in response to the inputted startGroup command.

In the embodiment of the present disclosure, a command group storage unit is started and a snapshot session is started in response to the startGroup command inputted by the developer.

The command group storage unit may be a section of the storage space opened up in the memory.

The snapshot session, which is a snapshot cache in the memory, is used to back up data in the memory at a certain time.

S202: putting at least one target object into the snapshot session in response to the inputted snapshot capture command, where each target object corresponds to an instance of a data class in the target software.

In the embodiment of the present disclosure, the target object may be an instance of any data class in the target software. The data class may be a code attribute description that implements a certain type of method in the target software, and the target object is a code that implements a series of processing methods of a specific function in the target software.

For example, the target software is the content creating software, and the specific function realized by the target object is the operation of performing special effects processing on the text for the user in the content creating software. Or, the target object may also be a continuously changing control (such as a sliding float) that the user drags with the mouse.

Specifically, each target object is put into the snapshot session to cache and backup the code of each target object.

S203: updating a status of each target object in the snapshot session based on a simulation operation.

In the embodiment of the present disclosure, updating the status of each target object in the snapshot session in response to a user operation simulated by the developer. The purpose of the developer to change and update the target object is to simulate the user has implemented the operation of a specific function corresponding to the target object.

For example, the developer updates the target object (code for special effect processing) to simulate the user has implemented the special effect processing operation on the text in the content creating software.

S204: in response to the inputted endGroup command, closing the snapshot session, extracting each target object from the snapshot session to obtain change information of each target object before and after updating, generating a command pair for each target object according to the change information, pressing the command pair into the command group storage unit, and closing the command group storage unit.

In the embodiment of the present disclosure, closing the snapshot session and closing the command group storage unit in response to the endGroup command inputted by the developer.

Among them, after the snapshot session is closed, each target object in the snapshot session is taken out and the target object (updated) is cached for backup. The target object (before updating) backed up in step S202 is compared with the target object (after updating) to obtain the change information of the target object, and the change information is converted into a command pair of each target object. The command pair includes two commands, corresponding to an undo operation (undo) and a redo operation (redo) respectively. The command pair of each target object is pressed into the command group storage unit.

S205: pressing a reset command into a reset command stack of the target software by using a command group of all command pairs in the command group storage unit as the reset command, for a user to perform an undo operation or a redo operation when using the target software.

In the embodiment of the present disclosure, generating a reset command (that is, the command group is equivalent to a reset command) by taking the command pairs of all target objects in the command group storage unit as a whole, and pressing it into the reset command stack of the target software. The reset command in the reset command stack is used for the software user to perform an undo operation or a redo operation by operating the button corresponding to the reset command when using the target software.

It can be seen from the above description that starting a command group storage unit and starting a snapshot session through the inputted startGroup command; the developer may either directly perform the reset command configuration on the target software in an command-type manner through the inputted operation execution command, or realize performing the reset command configuration on the target software in the snapshot-type manner by converting change information of an object in the snapshot session into a command pair through the snapshot capture command, pressing the command pair into the command group storage unit, and using all command groups of the command pair as a reset command, thereby achieving that the target software supports both the command-type reset command configuration and the snapshot-type reset command configuration, which is convenient for the developer to perform the reset command configuration on the target software in different configuration manners.

In the embodiment of this disclosure, the specific process that the extracting each target object from the snapshot session to obtain the change information of each target object before and after updating, and the generating the command pair for each target object according to the change information in the above step S204 is described in detail as follows.

S301: determining a target object before updating and a target object after updating, and serializing the target object before updating and the target object after updating respectively.

In the embodiment of the present disclosure, the process of serializing the target object is the process of converting the target object into structured data. The structured data may be the corresponding relationship between an attribute name and an attribute value.

Taking target object a as an example, for target object a before updating, the serialized structured data (the corresponding relationship between the attribute name and the attribute value) is:

x: 12
y: ture
kkk: 'abcde'.

Taking target object a as an example, for target object a after updating, the serialized structured data is:

x: 12
y: false
kkk: 'abcde'.

S302: comparing the serialized target object before updating with the serialized target object after updating to obtain a comparison result of the target object before and after updating.

In the embodiment of the present disclosure, the attribute name whose attribute value changes in the target object is obtained by comparing the corresponding relationship between the attribute name and the attribute value of the target object before and after updating.

Taking target object a as an example, the comparison result after the comparing is:

y:ture→false.

S303: generating a command pair according to the comparison result.

The generating the command pair according to the comparison result in S303, specifically includes the following.

S3031: assigning, based on the comparison result, a value to an attribute name that has changed in each target object to obtain a corresponding relationship between the attribute name and an attribute value before updating, and a corresponding relationship between the attribute name and the attribute value after updating.

In the embodiment of the present disclosure, a value is assigned to an attribute name that has changed in each target object, a value is assigned to the attribute name that has changed according to the attribute value before and after updating respectively.

Taking target object a as an example, true is assigned to attribute name y of object a; false is assigned to attribute name y of object a.

S3032: converting the corresponding relationship between the attribute name and the attribute value before updating into a command and converting the corresponding relationship between the attribute name and the attribute value after updating into a command to obtain the command pair.

In the embodiment of the present disclosure, the corresponding relationship between the attribute name and the attribute value before updating is converted into an undo command (undo), the corresponding relationship between the attribute name and the attribute value after updating is converted into a redo command (redo).

Taking target object a as an example, "true is assigned to attribute name y of object a" is converted to the undo command (undo); "false is assigned to attribute name y" is converted to the redo operation command (redo).

It can be seen from the above description that compared with the existing caching the overall snapshot data of the target object, the memory consumption is less by serializing the target object before and after updating, analyzing and comparing the changed data parts in the target object, and generating the command pair for the changed data parts.

Figure 3:
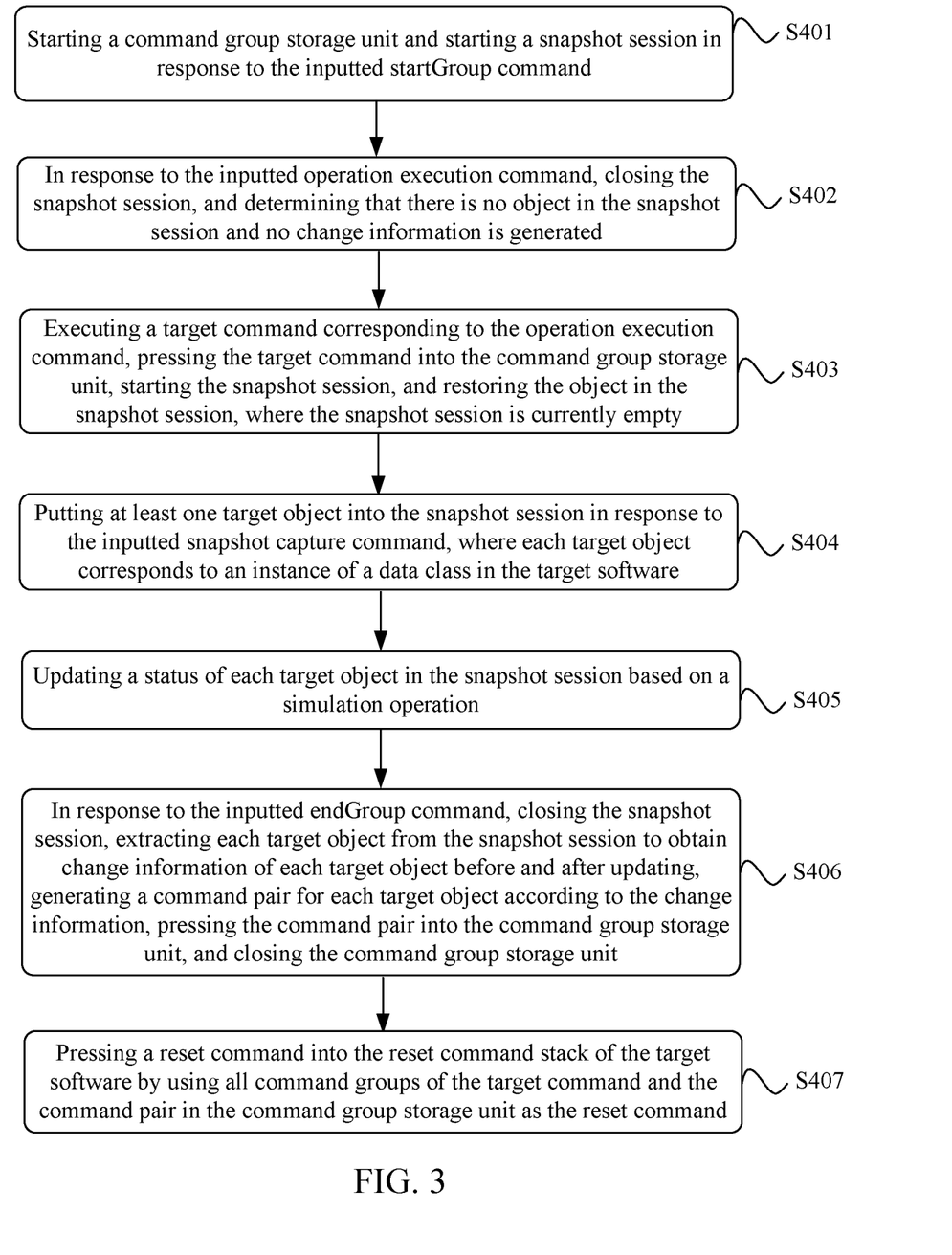
FIG. 3 is a second schematic flowchart of a method for reset command configuration provided by an embodiment of the present disclosure.

Referring to FIG. 3, FIG. 3 is a second schematic flowchart of a method for reset command configuration provided by an embodiment of the present disclosure. On the basis of the embodiment in FIG. 2, the embodiment mainly describes the reset command configuration scenario in which the target software is first configured in the command-type manner and then configured in the snapshot-type configuration manner, through an editor, which is detailed as follows.

S401: starting a command group storage unit and starting a snapshot session in response to the inputted startGroup command.

The developer inputs the startGroup command (start Group), the command group storage unit (group: [ . . . ) is started and the snapshot session (session: { . . . ) is started.

S402: in response to the inputted operation execution command, closing the snapshot session, and determining that there is no object in the snapshot session and no change information is generated.

The developer inputs the operation execution command (execute command1) and closes the snapshot session (session: { . . . ) is closed, at this moment, if there is no target object in the snapshot session (session: { . . . ), neither change information nor command pair will be generated.

S403: executing a target command corresponding to the operation execution command, pressing the target command into the command group storage unit, starting the snapshot session, and restoring the object in the snapshot session, where the snapshot session is currently empty.

The target command (command1) corresponding to the operation execution command is executed, the target command (command1) is pressed into the command group storage unit (group: [ . . . ) to obtain group: [command1, . . . , and the snapshot session (session: { . . . ) is started.

S404: putting at least one target object into the snapshot session in response to the inputted snapshot capture command, where each target object corresponds to an instance of a data class in the target software.

The developer inputs the snapshot capture command (snapshot), and the target object objA is put into the snapshot session to obtain the snapshot session (session: {objA, . . . ).

S405: updating a status of each target object in the snapshot session based on a simulation operation.

The developer simulates the user to update the status of the target object (objA), for example, changing objA ['x']=1 to objA ['x']=2.

S406: in response to the inputted endGroup command, closing the snapshot session, extracting each target object from the snapshot session to obtain change information of each target object before and after updating, generating a command pair for each target object according to the change information, pressing the command pair into the command group storage unit, and closing the command group storage unit.

The developer inputs the endgroup command (endGroup), the snapshot session (session: {objA, . . . ) is closed, the change information (diff) before and after updating of the target object is compared, the command pair (diff_objA) is generated according to the change information (diff), the command pair (diff_objA) is pressed into the command group storage unit (group: [command1, diff_objA, . . . ), the command group storage unit is closed, and group: [command1, diff_objA] is obtained.

S407: pressing a reset command into the reset command stack of the target software by using all command groups of the target command and the command pair in the command group storage unit as the reset command.

The reset command is pressed into the reset command stack of the target software by using the command group composed of group: [command1, diff_objA] as a reset command.

It can be seen from the above description that the target software is first configured in the command-type manner and then configured in the snapshot-type configuration manner, through an editor, is realized by using the command group determined by the target command of the command-type configuration and the command pair of the snapshot-type configuration as a reset command and pressing the reset command into the reset command stack of the target software.

Figure 4:
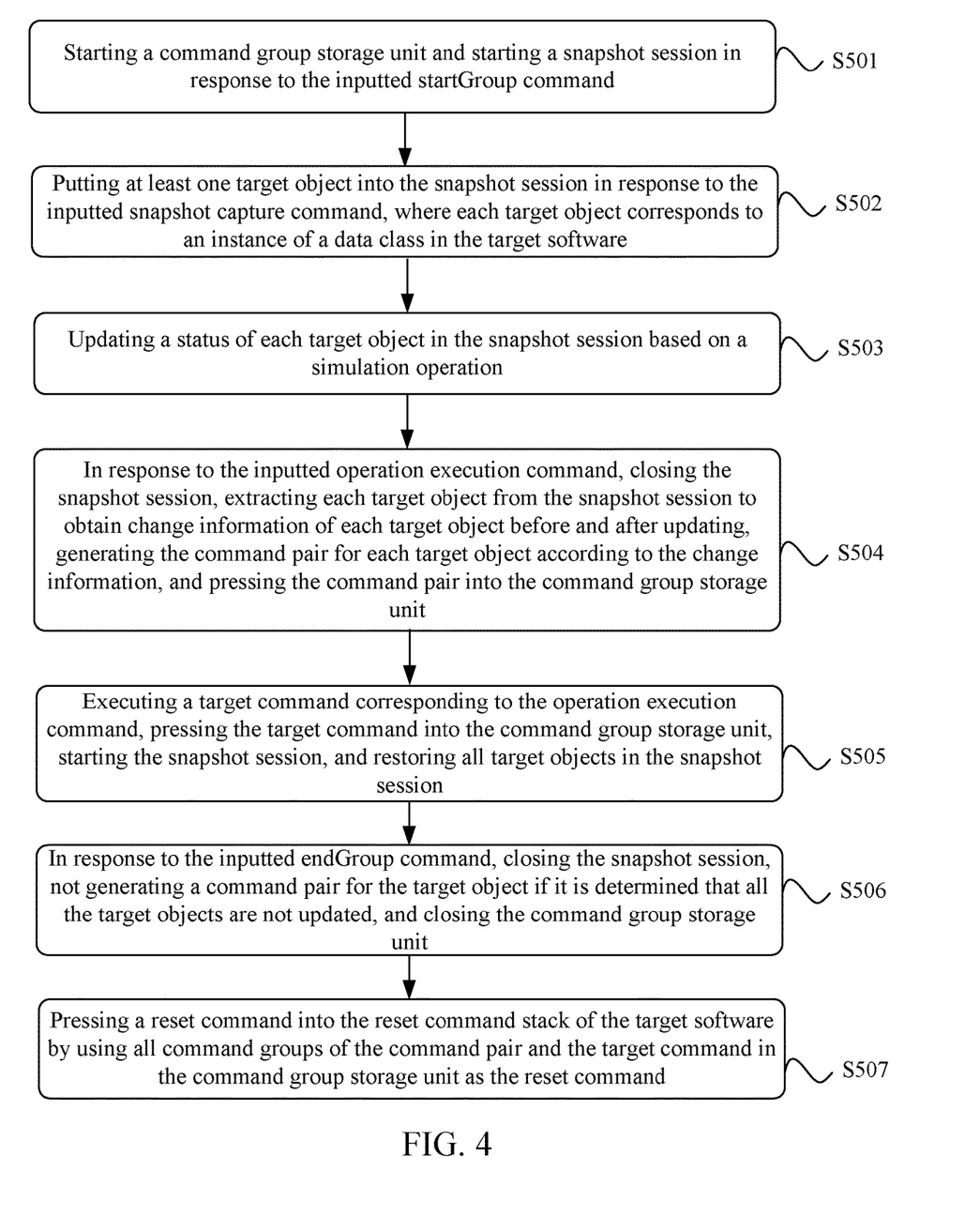
FIG. 4 is a third schematic flowchart of a method for reset command configuration provided by an embodiment of the present disclosure.

Referring to FIG. 4, FIG. 4 is a third schematic flowchart of a method for reset command configuration provided by an embodiment of the present disclosure. On the basis of the embodiment in FIG. 2, the embodiment mainly describes the reset command configuration scenario in which the snapshot-type configuration is performed first and then the command-type configuration is performed, which is detailed as follows.

S501: starting a command group storage unit and starting a snapshot session in response to the inputted startGroup command.

The developer inputs the startGroup command (start Group), the command group storage unit (group: [ . . . ) is started and the snapshot session (session: { . . . ) is started.

S502: putting at least one target object into the snapshot session in response to the inputted snapshot capture command, where each target object corresponds to an instance of a data class in the target software.

The developer inputs the snapshot capture command (snapshot), and the target object objA is put into the snapshot session to obtain the snapshot session (session: {objA, . . . ).

S503: updating a status of each target object in the snapshot session based on a simulation operation.

The developer simulates the user to update the status of the target object (objA), for example, changing objA ['x']=1 to objA ['x']=2.

S504: in response to the inputted operation execution command, closing the snapshot session, extracting each target object from the snapshot session to obtain change information of each target object before and after updating, generating the command pair for each target object according to the change information, and pressing the command pair into the command group storage unit.

The developer inputs the operation execution command (execute command1), the snapshot session (session: {objA, . . . ) is closed, compares the change information (diff) before and after updating of the target object is compared, the command pair (diff_objA) is generated according to the change information (diff), the command (pair diff_objA) is pressed into the command group storage unit, and group:[diff_objA, . . . is obtained.

S505: executing a target command corresponding to the operation execution command, pressing the target command into the command group storage unit, starting the snapshot session, and restoring all target objects in the snapshot session.

The target command command1 corresponding to the operation execution command is executed, the target command command1 is pressed into the command group storage unit (group:[diff_objA,command1, . . . ). The target object in the snapshot session is restored, at the moment, the target object in the snapshot session is an empty session: { . . . .

S506: in response to the inputted endGroup command, closing the snapshot session, not generating a command pair for the target object if it is determined that all the target objects are not updated, and closing the command group storage unit.

The developer inputs the endGroup command (end Group), the command group storage unit is closed, and group: [diff_objA,command1] is obtained.

S507: pressing a reset command into the reset command stack of the target software by using all command groups of the command pair and the target command in the command group storage unit as the reset command.

The reset command is pressed into the reset command stack of the target software by using the command group composed of group: [command1, diff_objA] as the reset command.

It can be seen from the above description that the target software is first configured in the snapshot-type manner, and then configured in the command-type manner is, through an editor, is realized by using the command group determined by the command pair of the snapshot-type configuration and the target command of the command-type configuration as a reset command and pressing the reset command into the reset command stack of the target software.

In an embodiment of the present disclosure, on the basis of the above embodiments, the embodiments mainly describe the scenario how to nest and mix the snapshot-type configuration and the command-type configuration, which is detailed as follows.

S601: starting a command group storage unit and starting a snapshot session in response to the inputted startGroup command.

The developer inputs the startGroup command (start Group), the command group storage unit (group: [ . . . ) is started and the snapshot session (session: { . . . ) is started.

S602: putting at least one target object into the snapshot session in response to an inputted snapshot capture command, where each target object corresponds to an instance of a data class in the target software.

The developer inputs the snapshot capture command (snapshot), and the target object objA is put into the snapshot session to obtain the snapshot session (session: {objA, . . . ).

S603: updating a status of each target object in the snapshot session based on a simulation operation.

The developer simulates the user to update the status of the target object (objA), for example, changing objA ['x']=1 to objA ['x']=2.

S604: in response to an inputted new startGroup command, closing the snapshot session, extracting each target object from the snapshot session to obtain change information of each target object before and after updating, generating a command pair for each target object according to the change information, pressing the command pair into the command group storage unit, putting all target objects extracted from the snapshot session into a temporary object stack, restarting the snapshot session, and starting a new command group storage unit.

The developer inputs the new startGroup command, the snapshot session (session: {objA, . . . ) is closed, the change information (diff) before and after updating of the target object (objA) is compared, the command pair (diff_objA) is generated according to the change information diff, the command pair (diff_objA) is pressed into the command group storage unit (group:[diff_objA, . . . ). The target object (objA) is put into the temporary object stack {objA}, the snapshot session (session: { . . . } ) is started again, and a new command group storage unit (group: [diff_objA, [ . . . } ) is started.

S605: in response to the inputted operation execution command, closing the snapshot session, and determining that there is no object in the snapshot session and no change information is generated; executing a target command corresponding to the operation execution command, and pressing the target command into the new command group storage unit, starting the snapshot session, and restoring the object in the snapshot session, where the snapshot session is currently empty.

The developer inputs the operation execution command (execute command1) and the snapshot session (session: { . . . } ) is closed, and there is no target object in the snapshot session no change information is generated. The target command (command1) is executed, the target command (command1) is pressed into the new command group storage unit to obtain (group:[diff_objA,[command1, . . . ). The snapshot session (session: { . . . } ) is started, the object in the snapshot session is restored, where the snapshot session is currently empty.

S606: in response to the inputted endGroup command, closing the snapshot session, determining that the snapshot session is currently empty, and closing the new command group storage unit.

The developer inputs endGroup, the snapshot session (session: { . . . } ) is closed, the new command group storage unit is closed, and group:[diff_objA,[command1], . . . is obtained.

S607: restarting the snapshot session, and restoring all target objects in the temporary object stack to the snapshot session.

Since the started command group storage unit in step S601 has not been closed, the target object objA of {objA} in the temporary object stack is restored into the closed snapshot session (session: { . . . } ) to obtain the snapshot session (session: {objA, . . . } ).

S608: updating the status of each target object in the snapshot session based on the simulation operation again.

The developer simulates the user to update the status of the target object objA, for example, changing objA ['x']=2 to objA ['x']=3.

S609: in response to an endGroup command inputted again, closing the snapshot session, extracting each target object from the snapshot session to obtain new change information of each target object before and after updating, and generating a new command pair for each target object according to the new change information, pressing the new command pair into the command group storage unit, and closing the command group storage unit.

The developer inputs the end Group again, the snapshot session (session: {objA, . . . } ) is closed, the new change information (diff) before and after updating of the target object (objA) is compared, the new command pair (diff_objA') is generated according to the new change information (diff), the new command pair (diff_objA') is pressed into the command group storage unit (group:[diff_objA,[command1], diff_objA', . . . ). the command group storage unit is closed, and group:[diff_objA,[command1], diff_objA'] is obtained.

S610: pressing a reset command into the reset command stack of the target software by using all command groups of the command pair and the target command nested in all command group storage units as the reset command.

The reset command is pressed into the reset command stack of the target software by using all command groups of the command pair and the target command nested (group: [diff_objA,[command1], diff_objA']) as the reset command.

It can be seen from the above description that more snapshot-type configurations and command-type configurations can be embedded in one reset command by configuring the reset command of the target software in the nested and mixed manner of the snapshot-type configuration and the command-type configuration, which is convenient for the developer to configure and simulate more user operations.

Figure 5:
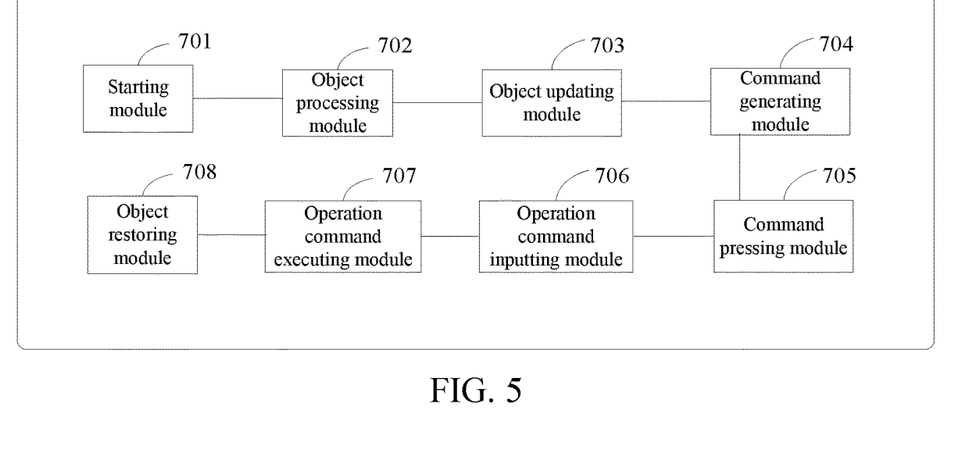
FIG. 5 is a structural block diagram of an apparatus for reset command configuration provided by an embodiment of the present disclosure.

Corresponding to the reset command configuration method of the above embodiment, FIG. 5 is a structural block diagram of an apparatus for reset command configuration provided by an embodiment of the present disclosure; for the ease of explanation, only parts related to the embodiments of the present disclosure are shown. Referring to FIG. 5, the apparatus includes a starting module 701, an object processing module 702, an object updating module 703, a command generating module 704, and a command pressing module 705.

The starting module 701 is configured to start a command group storage unit and start a snapshot session in response to the inputted startGroup command.

The object processing module 702 is configured to put at least one target object into the snapshot session in response to the inputted snapshot capture command, where each target object corresponds to an instance of a data class in the target software.

The object updating module 703 is configured to update a status of each target object in the snapshot session based on a simulation operation.

The command generating module 704 is configured to, in response to the inputted endGroup command, close the snapshot session, extract each target object from the snapshot session to obtain change information of each target object before and after updating, generate a command pair for each target object according to the change information, press the command pair into the command group storage unit, and close the command group storage unit.

The command pressing module 705 is configured to press a reset command into a reset command stack of the target software by using a command group of all command pairs in the command group storage unit as the reset command, for a user to perform an undo operation or a redo operation when using the target software.

It can be seen from the above description that starting a command group storage unit and starting a snapshot session through the inputted startGroup command; the developer may either directly perform the reset command configuration on the target software in an command-type manner through the inputted operation execution command, or realize performing the reset command configuration on the target software in the snapshot-type manner by converting change information of an object in the snapshot session into a command pair through the snapshot capture command, pressing the command pair into the command group storage unit, and using all command groups of the command pair as a reset command, thereby achieving that the target software supports both the command-type reset command configuration and the snapshot-type reset command configuration, which is convenient for the developer to perform the reset command configuration on the target software in different configuration manners.

In one embodiment of the present disclosure, the command generating module 704 is specifically configured to determine a target object before updating and a target object after updating, and serialize the target object before updating and the target object after updating respectively; compare the serialized target object before updating with the serialized target object after updating to obtain a comparison result of the target object before and after updating; and generate the command pair according to the comparison result.

In one embodiment of the present disclosure, the command generating module 704 is specifically configured to assign, based on the comparison result, a value to an attribute name that has changed in each target object to obtain a corresponding relationship between the attribute name and an attribute value before updating, and a corresponding relationship between the attribute name and the attribute value after updating, convert the corresponding relationship between the attribute name and the attribute value before updating into a command and convert the corresponding relationship between the attribute name and the attribute value after updating into a command to obtain the command pair.

Continuing with reference to FIG. 5, in one embodiment of the present disclosure, the apparatus further includes an operation command inputting module 706 and an operation command executing module 707.

The operating command inputting module 706 is configured to, in response to the inputted operation execution command, close the snapshot session, and determine that there is no object in the snapshot session and no change information is generated.

The operating command executing module 707 is configured to execute a target command corresponding to the operation execution command, press the target command into the command group storage unit, start the snapshot session, and restore the object in the snapshot session, where the snapshot session is currently empty.

The command pressing module 705 is further configured to press a reset command into the reset command stack of the target software by using all command groups of the target command and the command pair in the command group storage unit as the reset command.

In one embodiment of the present disclosure, the operating command inputting module 706 is further configured to, in response to the inputted operation execution command, close the snapshot session, extract each target object from the snapshot session to obtain change information of each target object before and after updating, generate the command pair for each target object according to the change information, and press the command pair into the command group storage unit.

The operating command executing module 707 is further configured to execute a target command corresponding to the operation execution command, press the target command into the command group storage unit, start the snapshot session, and restore all the target objects in the snapshot session.

The command pressing module 705 is further configured to, in response to the inputted endGroup command, close the snapshot session, not generate a command pair for the target object if it is determined that all the target objects are not updated, and close the command group storage unit; press a reset command into the reset command stack of the target software by using all command groups of the command pair and the target command in the command group storage unit as the reset command.

Continuing with reference to FIG. 5, in one embodiment of the present disclosure, the apparatus further includes an object restoring module 708.

The object processing module 702 is configured to put at least one target object into the snapshot session in response to the inputted snapshot capture command, where each target object corresponds to an instance of a data class in the target software.

The object updating module 703 is configured to update a status of each target object in the snapshot session based on a simulation operation.

The starting module 701 is further configured to, in response to an inputted new startGroup command, close the snapshot session, extract each target object from the snapshot session to obtain change information of each target object before and after updating, generate a command pair for each target object according to the change information, press the command pair into the command group storage unit, put all target objects extracted from the snapshot session into a temporary object stack, restart the snapshot session, and start a new command group storage unit.

The operating command inputting module 706 is further configured to, in response to the inputted operation execution command, close the snapshot session, and determine that there is no object in the snapshot session and no change information is generated; execute a target command corresponding to the operation execution command, and press the target command into the new command group storage unit, start the snapshot session, and restore the object in the snapshot session, where the snapshot session is currently empty.

The object restoring module 708 is configured to, in response to the inputted endGroup command, close the snapshot session, determine that the snapshot session is currently empty, and close the new command group storage unit; restart the snapshot session, and restore all target objects in the temporary object stack to the snapshot session.

The object updating module 703 is further configured to update the status of each target object in the snapshot session based on the simulation operation again.

The command generating module 704 is further configured to, in response to an endGroup command inputted again, close the snapshot session, extract each target object from the snapshot session to obtain new change information of each target object before and after updating, and generate a new command pair for each target object according to the new change information, press the new command pair into the command group storage unit, and close the command group storage unit.

The command pressing module 705 is further configured to press a reset command into the reset command stack of the target software by using all command groups of the command pair and the target command nested in all command group storage units as the reset command.

The reset command configuration apparatus provided by the embodiments of the present disclosure may be used to implement the technical solution of the above method embodiments, the realization principle and technical effect therebetween are similar, which will not be repeated herein.

In order to realize the above embodiments, embodiments of the present disclosure also provide an electronic device.

Figure 6:
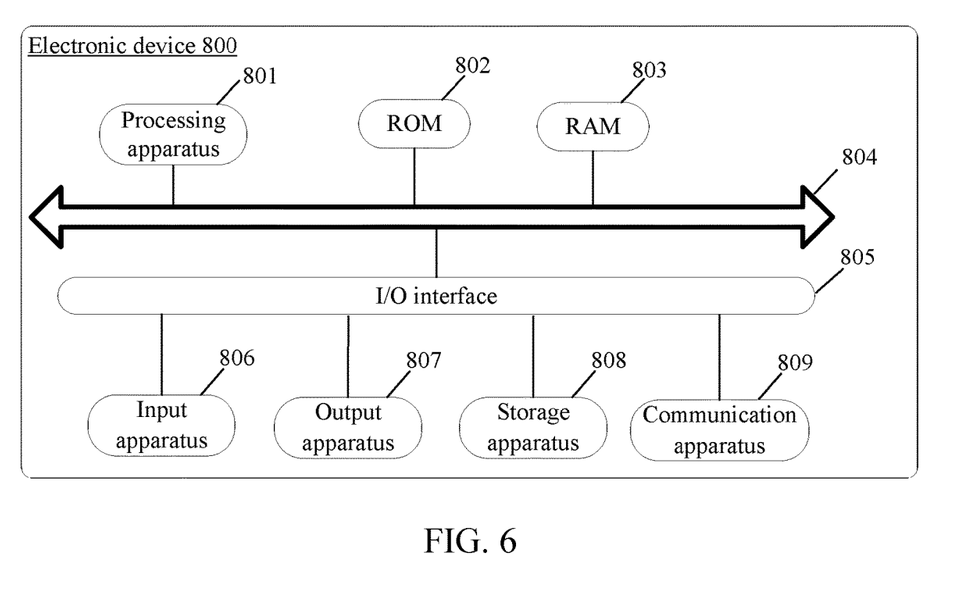
FIG. 6 is a schematic diagram of a hardware structure of an electronic device provided by an embodiment of the present disclosure.

Referring to FIG. 6, which illustrates a structural diagram of an electronic device 800 suitable for implementing an embodiment of the present disclosure, the electronic device 800 may be a terminal device or a server. The terminal device may include but are not limited to mobile terminals such as a mobile phone, a laptop, a digital broadcast receiver, a personal digital assistant (PDA), a portable Android device (PAD), a portable media player (PMP), a vehicle terminal (such as a vehicle navigation terminal), etc., and fixed terminals such as a digital TV, a desktop computer, etc. The electronic device shown in FIG. 6 is only an example, and there should be no limitations on the function and scope of use of the embodiments of the present disclosure.

As shown in FIG. 6, the electronic device 800 may include a processing apparatus 801 (such as a central processing unit, a graphics processing unit, etc.), which may perform various appropriate actions and processing according to a computer program stored in a read-only memory (ROM) 802 or a computer program loaded into a random access memory (RAM) 803 from a storage apparatus 808. Various programs and data required for the operation of the electronic device 800 may also be stored in the RAM 803. The processing apparatus 801, the ROM 802, and the RAM 803 are connected to each other through a bus 804. An input/output (I/O) interface 805 is also connected to the bus 804.

In general, the following apparatus may be connected to the I/O interface 805, including: an input apparatus 806, such as a touchscreen, a touchpad, a keyboard, a mouse, a camera, a microphone, an accelerometer, a gyrometer, etc.; an output apparatus 807, such as a liquid crystal display (LCD), a speaker, a shaker, etc.; a storage apparatus 808, such as a magnetic disk, a hard disk, etc.; and a communication apparatus 809. The communication apparatus 809 allows the electronic device 800 to exchange data with other devices through a wireless or wire communication. Although FIG. 6 shows the electronic device 800 with various devices, it should be understood that it is not required to implement or provide all the devices shown. More or fewer devices may alternatively be implemented or provided.

In particular, according to the embodiment of the present disclosure, the process described above with reference to the flowchart may be implemented as a computer software program. For example, embodiments of the present disclosure include a computer program product, which includes a computer program loaded on a computer readable medium, and the computer program includes program code for executing the method shown in a flowchart. In such an embodiment, the computer program may be downloaded and installed from the network through the communication apparatus 809, or installed from the storage apparatus 808, or installed from the ROM 802. When the computer program is executed by the processing apparatus 801, the above functions defined in the method of the embodiment of the present disclosure are executed.

It should be noted that the computer readable medium described in the present disclosure may be a computer readable signal medium, a computer readable storage medium, or any combination of the above two. The computer readable storage medium may be, for example, but not limited to, an electrical, magnetic, optical, electromagnetic, infrared, or semiconductor system, apparatus, or device, or any combination the foregoing. More specific examples of the computer readable storage medium may include, but are not limited to: an electrical connection with one or more wires, a portable computer disk, a hard disk, a random access memory (RAM), a read-only memory (ROM), an erasable programmable read only memory (EPROM or flash memory), a fiber optic, a portable compact disk read-only memory (CD-ROM), an optical storage device, a magnetic storage device, or any suitable combination of the foregoing. In the present disclosure, a computer readable storage medium may be any tangible medium containing or storing a program, which may be used by or in combination with an instruction execution system, apparatus, or device. And in the present disclosure, the computer readable signal medium may include data signals transmitted in the baseband or as part of the carrier, in which computer readable program code is carried. Such transmitted data signals may take various forms, including but not limited to electromagnetic signals, optical signals or any suitable combination of the above. The computer readable signal medium may also be any computer readable medium other than the computer readable storage medium, which may transmit, propagate, or transmit programs for use by or in combination with an instruction execution system, apparatus, or device. The program code contained on the computer readable medium may be transmitted using any suitable medium, including an electrical wire, an optical fiber cable, radio frequency (RF), etc., or any suitable combination of the foregoing.

The above computer readable medium may be embodied in the above electronic device; and may also exist alone without being assembled into the electronic device.

The above computer readable medium carries one or more programs which, when executed by the electronic device, enable the electronic device to execute the method illustrated in the above embodiments.

The computer program code for implementing operations in the embodiments of the present disclosure may be written in one or more programming languages or the combination thereof, including object-oriented programming languages—such as Java, Smalltalk, C++, and conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet Service Provider).

The flowcharts and block diagrams in the accompanying drawings illustrate the architecture, functionality, and operations of possible implementations of systems, methods, and computer program products according to various embodiments of the present disclosure. In this regard, each block in the flowchart or block diagrams may represent a module, a program segment, or a portion of code, which includes one or more executable instructions for implementing the specified logical functions. It should also be noted that, in some alternative implementations, the functions noted in the blocks may occur out of the order noted in the drawing. For example, two blocks shown in succession may, in fact, be executed substantially in parallel, or the blocks may also sometimes be executed in the reverse order, depending on the functions involved. It is also noted that each block in the block diagrams and/or flowcharts, and a combination of the blocks may be implemented by a dedicated hardware-based system for performing specified functions or operations, or by a combination of dedicated hardware and computer instructions.

The involved units described in the embodiments of the present disclosure may be implemented in a software manner, and may also be implemented in a hardware manner. Where the name of the unit does not constitute a limitation of the unit itself in some cases, for example, a first obtaining unit may also be described as "obtaining a unit of at least two IP addresses".

The functions described in the embodiments of the present disclosure may be executed, at least in part, by one or more hardware logic components. For example, unrestrictedly, exemplary types of hardware logic components that may be used include: a field-programmable gate array (FPGA), an application specific integrated circuit (ASIC), an application specific standard product (ASSP), a system on chip (SOC), a complex programmable logic device (CPLD) and so on.

In the context of the embodiments of the present disclosure, a computer-readable storage medium may be a tangible medium that may contain or store a program for use by or in connection with an instruction execution system, apparatus, or device. A machine readable medium may be a machine readable signal medium or a machine readable storage medium. The machine readable storage media may include, but is not limited to, for example, an electrical, magnetic, optical, electromagnetic, infrared, or semiconductor system, apparatus, or device, or any suitable combination of the foregoing. More specific examples of machine readable storage medium may include, but are not limited to an electrical connection with one or more wires, a portable computer disk, a hard disk, a random access memory (RAM), a read-only memory (ROM), an erasable programmable read only memory (EPROM or a flash memory), a fiber optic, a portable compact disk read-only memory (CD-ROM), an optical storage device, a magnetic storage device, or any suitable combination of the foregoing.

The above description is merely embodiments of the present disclosure and explanations of the technical principles employed. Those skilled in the art should understand that the scope of disclosure involved in the present disclosure is not limited to the technical solutions formed by the specific combination of the above technical features, and should also cover, without departing from the above disclosed concept, other technical solutions formed by any combination of the above technical features or their equivalent features. For example, a technical solution formed by replacing the above features with technical features that have similar functions to those disclosed in the present disclosure (but not limited to).

Additionally, although each operation is depicted in a particular order, which should not be understood as requiring that the operations should be performed in the particular order shown or in a sequential order. Multitask and parallel processing may be advantageous under certain circumstances. Likewise, although the above discussion contains several specific implementation details, those should not be construed as limitations on the scope of the present disclosure. Certain features described in the context of separate embodiments may also be implemented in combination in a single embodiment. Conversely, various features described in the context of a single embodiment may also be implemented in multiple embodiments separately or in any suitable sub-combination.

Although the subject matter has been described in language specific to structural features and/or method logic actions, it should be understood that the subject matter defined in the appended claims is not necessarily limited to the specific features or actions described above. Rather, the specific features and actions described above are merely example forms for implementing the claims.

What is claimed is:

1. A method for reset command configuration, applied to an editor of target software, the editor is configured with a command inputting module, and the command inputting module is used to input a startGroup command, an endGroup command, a snapshot capture command and an operation execution command for executing command-type configuration; the method comprises:
   starting a command group storage unit and starting a snapshot session in response to the inputted startGroup command;
   putting at least one target object into the snapshot session in response to the inputted snapshot capture command, wherein each target object corresponds to an instance of a data class in the target software;
   updating a status of each target object in the snapshot session based on a simulation operation;
   in response to the inputted endGroup command, closing the snapshot session, extracting each target object from the snapshot session to obtain change information of each target object before and after updating, generating a command pair for each target object according to the change information, pressing the command pair into the command group storage unit, and closing the command group storage unit; and
   pressing a reset command into a reset command stack of the target software by using all command groups of the command pair in the command group storage unit as the reset command, for a user to perform an undo operation or a redo operation when using the target software.

2. The method according to claim 1, wherein the extracting each target object from the snapshot session to obtain the change information of each target object before and after updating, and the generating the command pair for each target object according to the change information comprises:
   determining a target object before updating and a target object after updating, and serializing the target object before updating and the target object after updating respectively;
   comparing the serialized target object before updating with the serialized target object after updating to obtain a comparison result of the target object before and after updating; and
   generating the command pair according to the comparison result.

3. The method according to claim 2, wherein the generating the command pair according to the comparison result comprises:
   assigning, based on the comparison result, a value to an attribute name that has changed in each target object to obtain a corresponding relationship between the attribute name and an attribute value before updating, and a corresponding relationship between the attribute name and the attribute value after updating; and
   converting the corresponding relationship between the attribute name and the attribute value before updating into a command and converting the corresponding relationship between the attribute name and the attribute value after updating into a command to obtain the command pair.

4. The method according to claim 1, before the putting the at least one target object into the snapshot session in response to the inputted snapshot capture command, further comprising:
   in response to the inputted operation execution command, closing the snapshot session, and determining that there is no object in the snapshot session and no change information is generated;
   executing a target command corresponding to the operation execution command, pressing the target command into the command group storage unit, starting the snapshot session, and restoring the object in the snapshot session, wherein the snapshot session is currently empty;

correspondingly, after the pressing the command pair into the command group storage unit and closing the command group storage unit, further comprising:

pressing a reset command into the reset command stack of the target software by using all command groups of the target command and the command pair in the command group storage unit as the reset command.

5. The method according to claim 1, after the updating the status of each target object in the snapshot session based on the simulation operation, further comprising:

in response to the inputted operation execution command, closing the snapshot session, extracting each target object from the snapshot session to obtain change information of each target object before and after updating, generating the command pair for each target object according to the change information, and pressing the command pair into the command group storage unit;

executing a target command corresponding to the operation execution command, pressing the target command into the command group storage unit, starting the snapshot session, and restoring all target objects in the snapshot session;

in response to the inputted endGroup command, closing the snapshot session, not generating a command pair for the target object if it is determined that all the target objects are not updated, and closing the command group storage unit;

pressing a reset command into the reset command stack of the target software by using all command groups of the command pair and the target command in the command group storage unit as the reset command.

6. The method according to claim 1, after the starting the command group storage unit and starting the snapshot session in response to the inputted startGroup command, further comprising:

putting at least one target object into the snapshot session in response to the inputted snapshot capture command, wherein each target object corresponds to an instance of a data class in the target software;

updating a status of each target object in the snapshot session based on a simulation operation;

in response to an inputted new startGroup command, closing the snapshot session, extracting each target object from the snapshot session to obtain change information of each target object before and after updating, generating a command pair for each target object according to the change information, pressing the command pair into the command group storage unit, putting all target objects extracted from the snapshot session into a temporary object stack, restarting the snapshot session, and starting a new command group storage unit;

in response to the inputted operation execution command, closing the snapshot session, and determining that there is no object in the snapshot session and no change information is generated; executing a target command corresponding to the operation execution command, pressing the target command into the new command group storage unit, starting the snapshot session, and restoring the object in the snapshot session, wherein the snapshot session is currently empty;

in response to the inputted endGroup command, closing the snapshot session, determining that the snapshot session is currently empty, and closing the new command group storage unit;

restarting the snapshot session, and restoring all target objects in the temporary object stack to the snapshot session;

updating the status of each target object in the snapshot session based on the simulation operation again;

in response to an endGroup command inputted again, closing the snapshot session, extracting each target object from the snapshot session to obtain new change information of each target object before and after updating, and generating a new command pair for each target object according to the new change information, pressing the new command pair into the command group storage unit, and closing the command group storage unit; and pressing a reset command into the reset command stack of the target software by using all command groups of the command pair and the target command nested in all command group storage units as the reset command.

7. An apparatus for reset command configuration, comprising:

a processor and a memory;

wherein the memory has a computer-executable instruction stored therein;

the processor executes the computer-executable instruction stored in the memory to enable the processor to:

start a command group storage unit and start a snapshot session in response to the inputted startGroup command;

put at least one target object into the snapshot session in response to the inputted snapshot capture command, wherein each target object corresponds to an instance of a data class in the target software;

update a status of each target object in the snapshot session based on a simulation operation;

in response to the inputted endGroup command, close the snapshot session, extract each target object from the snapshot session to obtain change information of each target object before and after updating, generate a command pair for each target object according to the change information, press the command pair into the command group storage unit, and close the command group storage unit; and press a reset command into a reset command stack of the target software by using a command group of all command pairs in the command group storage unit as the reset command, for a user to perform an undo operation or a redo operation when using the target software.

8. The apparatus according to claim 7, wherein the processor is further enabled to:

determine a target object before updating and a target object after updating, and serialize the target object before updating and the target object after updating respectively;

compare the serialized target object before updating with the serialized target object after updating to obtain a comparison result of the target object before and after updating; and generate the command pair according to the comparison result.

9. The apparatus according to claim 8, wherein the processor is further enabled to:

assign, based on the comparison result, a value to an attribute name that has changed in each target object to obtain a corresponding relationship between the attribute name and an attribute value before updating, and a corresponding relationship between the attribute name and the attribute value after updating; and convert the corresponding relationship between the attribute name and the attribute value before updating into a command and convert the corresponding relationship between the attribute name and the attribute value after updating into a command to obtain the command pair.

10. The apparatus according to claim 7, wherein the processor is further enabled to:

in response to the inputted operation execution command, close the snapshot session, and determine that there is no object in the snapshot session and no change information is generated;

execute a target command corresponding to the operation execution command, press the target command into the command group storage unit, start the snapshot session, and restore the object in the snapshot session, wherein the snapshot session is currently empty;

press a reset command into the reset command stack of the target software by using all command groups of the target command and the command pair in the command group storage unit as the reset command.

11. The apparatus according to claim 7, wherein the processor is further enabled to:

in response to the inputted operation execution command, close the snapshot session, extract each target object from the snapshot session to obtain change information of each target object before and after updating, generate the command pair for each target object according to the change information, and press the command pair into the command group storage unit;

execute a target command corresponding to the operation execution command, press the target command into the command group storage unit, start the snapshot session, and restore all target objects in the snapshot session;

in response to the inputted endGroup command, close the snapshot session, not generate a command pair for the target object if it is determined that all the target objects are not updated, and close the command group storage unit;

press a reset command into the reset command stack of the target software by using all command groups of the command pair and the target command in the command group storage unit as the reset command.

12. The apparatus according to claim 7, wherein the processor is further enabled to:

put at least one target object into the snapshot session in response to the inputted snapshot capture command, wherein each target object corresponds to an instance of a data class in the target software;

update a status of each target object in the snapshot session based on a simulation operation;

in response to an inputted new startGroup command, close the snapshot session, extract each target object from the snapshot session to obtain change information of each target object before and after updating, generate a command pair for each target object according to the change information, press the command pair into the command group storage unit, put all target objects extracted from the snapshot session into a temporary object stack, restart the snapshot session, and start a new command group storage unit;

in response to the inputted operation execution command, close the snapshot session, and determine that there is no object in the snapshot session and no change information is generated; execute a target command corresponding to the operation execution command, press the target command into the new command group storage unit, start the snapshot session, and restore the object in the snapshot session, wherein the snapshot session is currently empty;

in response to the inputted endGroup command, close the snapshot session, determine that the snapshot session is currently empty, and close the new command group storage unit;

restart the snapshot session, and restore all target objects in the temporary object stack to the snapshot session;

update the status of each target object in the snapshot session based on the simulation operation again;

in response to an endGroup command inputted again, close the snapshot session, extract each target object from the snapshot session to obtain new change information of each target object before and after updating, and generate a new command pair for each target object according to the new change information, press the new command pair into the command group storage unit, and close the command group storage unit; and press a reset command into the reset command stack of the target software by using all command groups of the command pair and the target command nested in all command group storage units as the reset command.

13. A non-transitory computer readable storage medium storing a computer-executable instruction, wherein when the computer-executable instruction is executed by a processor, the processor is enabled to:

start a command group storage unit and start a snapshot session in response to the inputted startGroup command;

put at least one target object into the snapshot session in response to the inputted snapshot capture command, wherein each target object corresponds to an instance of a data class in the target software;

update a status of each target object in the snapshot session based on a simulation operation;

in response to the inputted endGroup command, close the snapshot session, extract each target object from the snapshot session to obtain change information of each target object before and after updating, generate a command pair for each target object according to the change information, press the command pair into the command group storage unit, and close the command group storage unit; and press a reset command into a reset command stack of the target software by using a command group of all command pairs in the command group storage unit as the reset command, for a user to perform an undo operation or a redo operation when using the target software.

14. The non-transitory computer readable storage medium according to claim 13, wherein when the computer-executable instruction is executed by the processor, the processor is further enabled to:

determine a target object before updating and a target object after updating, and serialize the target object before updating and the target object after updating respectively;

compare the serialized target object before updating with the serialized target object after updating to obtain a comparison result of the target object before and after updating; and generate the command pair according to the comparison result.

15. The non-transitory computer readable storage medium according to claim 14, wherein when the computer-executable instruction is executed by the processor, the processor is further enabled to:

assign, based on the comparison result, a value to an attribute name that has changed in each target object to obtain a corresponding relationship between the attribute name and an attribute value before updating, and a corresponding relationship between the attribute name and the attribute value after updating; and convert the corresponding relationship between the attribute name and the attribute value before updating into a command and convert the corresponding relationship between the attribute name and the attribute value after updating into a command to obtain the command pair.

16. The non-transitory computer readable storage medium according to claim 13, wherein when the computer-executable instruction is executed by the processor, the processor is further enabled to:

in response to the inputted operation execution command, close the snapshot session, and determine that there is no object in the snapshot session and no change information is generated;

execute a target command corresponding to the operation execution command, press the target command into the command group storage unit, start the snapshot session, and restore the object in the snapshot session, wherein the snapshot session is currently empty;

press a reset command into the reset command stack of the target software by using all command groups of the target command and the command pair in the command group storage unit as the reset command.

17. The non-transitory computer readable storage medium according to claim 13, wherein when the computer-executable instruction is executed by the processor, the processor is further enabled to:

in response to the inputted operation execution command, close the snapshot session, extract each target object from the snapshot session to obtain change information of each target object before and after updating, generate the command pair for each target object according to the change information, and press the command pair into the command group storage unit;

execute a target command corresponding to the operation execution command, press the target command into the command group storage unit, start the snapshot session, and restore all target objects in the snapshot session;

in response to the inputted endGroup command, close the snapshot session, not generate a command pair for the target object if it is determined that all the target objects are not updated, and close the command group storage unit;

press a reset command into the reset command stack of the target software by using all command groups of the command pair and the target command in the command group storage unit as the reset command.

18. The non-transitory computer readable storage medium according to claim 13, wherein when the computer-executable instruction is executed by the processor, the processor is further enabled to:

put at least one target object into the snapshot session in response to the inputted snapshot capture command, wherein each target object corresponds to an instance of a data class in the target software;

update a status of each target object in the snapshot session based on a simulation operation;

in response to an inputted new startGroup command, close the snapshot session, extract each target object from the snapshot session to obtain change information of each target object before and after updating, generate a command pair for each target object according to the change information, press the command pair into the command group storage unit, put all target objects extracted from the snapshot session into a temporary object stack, restart the snapshot session, and start a new command group storage unit;

in response to the inputted operation execution command, close the snapshot session, and determine that there is no object in the snapshot session and no change information is generated; execute a target command corresponding to the operation execution command, press the target command into the new command group storage unit, start the snapshot session, and restore the object in the snapshot session, wherein the snapshot session is currently empty;

in response to the inputted endGroup command, close the snapshot session, determine that the snapshot session is currently empty, and close the new command group storage unit;

restart the snapshot session, and restore all target objects in the temporary object stack to the snapshot session;

update the status of each target object in the snapshot session based on the simulation operation again;

in response to an endGroup command inputted again, close the snapshot session, extract each target object from the snapshot session to obtain new change information of each target object before and after updating, and generate a new command pair for each target object according to the new change information, press the new command pair into the command group storage unit, and close the command group storage unit; and press a reset command into the reset command stack of the target software by using all command groups of the command pair and the target command nested in all command group storage units as the reset command.

* * * * *